June 19, 1928. 1,674,227
R. H. REH
TRAP TOP FOR JARS
Filed Sept. 20, 1922
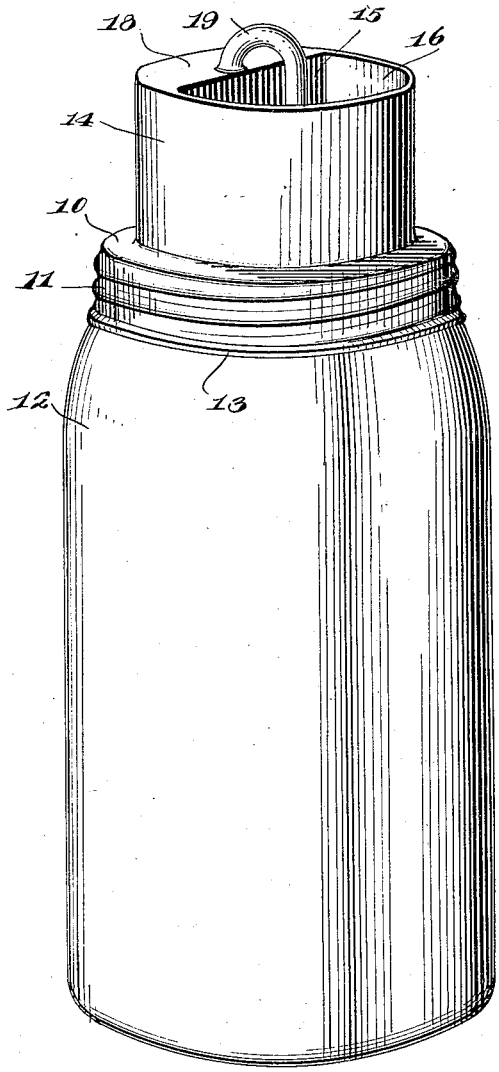
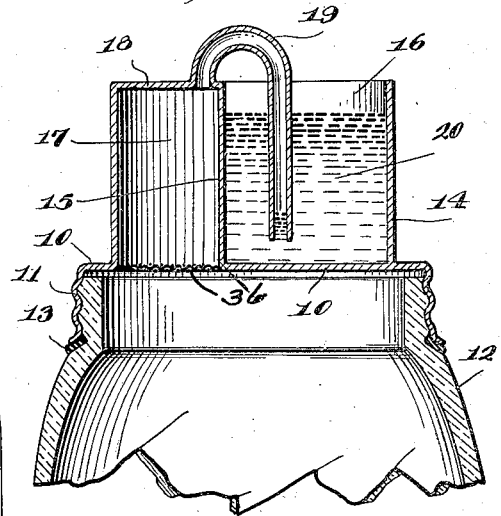
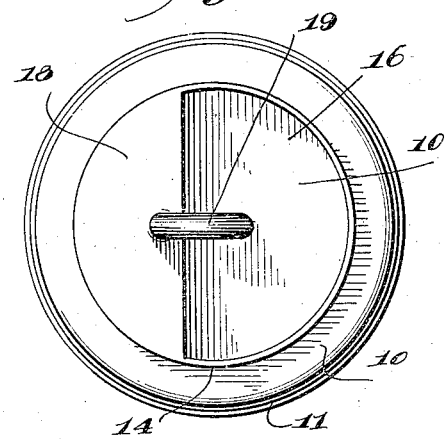
Inventor:
Rudolph H. Reh
By Edgar M. Kitchin
His Attorney.

Patented June 19, 1928.

1,674,227

UNITED STATES PATENT OFFICE.

RUDOLPH H. REH, OF FRESNO, CALIFORNIA.

TRAP TOP FOR JARS.

Application filed September 20, 1922. Serial No. 589,429.

The present invention relates to an attachment for fruit jars and the like for use in the manufacture of grape juice, or other juices made from raisins, dried fruit, berries, and the like.

The object of the invention is to provide a trap which is incorporated in the top structure for a jar or the like to permit escape of gases from the jar and to compensate for expansion of the contents of the jar, and, at the same time, to exclude air from the jar which would produce dissipation of the flavor and deterioration of the contents of the jar during the evaporating process.

Another object is to eliminate the complicated trap devices which have heretofore been employed for this purpose, and to provide a relatively simple device which may be individually applied to the small containers and which requires no adjustment of parts and which may be easily and economically handled, particularly for the production of small quantities of juices.

Briefly stated, the invention is embodied in the structure of a top or cap for a fruit jar, or the like, which is brought into operative position by merely screwing the cap or top on the jar, the cap being so constructed as to provide the necessary vent and a trap chamber which is adapted to contain a small quantity of water for effecting the seal and permitting the passage of gases generating in the jar outwardly from the water chamber.

With these and further objects in view as will in part hereinafter become apparent and in part be stated, the invention comprises certain novel constructions, combinations and arrangements of parts as subsequently specified and claimed.

In the accompanying drawings,—

Figure 1 is a perspective view of a jar top or cap constructed according to the present invention and shown as applied to an ordinary fruit jar.

Figure 2 is a vertical section taken through the same, the lower portion of the jar being broken away.

Figure 3 is a top plan view thereof.

Referring to the drawings by numerals, 10 designates the disc or body portion of a cap provided with the usual depending threaded flange 11 adapted to be screwed upon the upper end of a jar 12, or the like, in which the fruit, berries, or other substance, is adapted to be placed. The cap is provided with a compressible gasket 13 of the usual form, which is interposed between the neck of the jar 12 and the flange 11 of the cap for sealing the latter upon the jar.

The cap is provided upon its top with an upstanding wall 14 of annular form, and which is preferably spaced inwardly from the outer marginal edge of the top to facilitate handling of the top in positioning and removing it relatively to the jar, the wall 14 extending to an appreciable height above the disc of the top and provided therein with a transverse partition 15 forming at one side a water receptacle 16 and providing a chamber 17 at its other side. The disc 10 of the cap is continued beneath the receptacle 16 to form the bottom thereof, and is discontinued or apertured beneath the chamber 17 for establishing communication between the interior of the jar 12 and the chamber 17 for collecting gases from the jar in the chamber. The chamber 17 has a closed top wall 18 which seals the upper end of the chamber, and the top wall carries a U-shaped pipe or tube 19 which opens at one end into the top of the chamber 17 and which is arched downwardly into the receptacle 16 and terminates therein at a point near the bottom of the receptacle. The receptacle 16 is adapted to contain a body of liquid 20, such as water, which is adapted to surround the lower open end of the tube 19 for sealing the same against ingress of air and to permit the escape of gases through the tube 19 and through the body of water 20 to the atmosphere.

The trap thus formed is constructed with the top of the jar and the top may be readily removed and positioned with respect to the jar in the manner of an ordinary top. In use, the raisins, or dehydrated and dried grapes, or other dried fruit and berries, are placed in the jar 12 with a suitable quantity of water and are allowed to stand so that the water will take up the flavor, color and the soluble matter from the dried fruit or berries, and thus produce an agreeable beverage. The traps may be examined from time to time for detecting fermentation, and at the first indication of fermentation, by the appearance of bubbles rising through the water in the container 16, it becomes known that the process is completed in the production of the desired juices and that the product should not stand any longer so as to prevent the same from turning sour. By the use of this improved trap, the ordinary Mason fruit jar may be used, so that the juices may be produced in small quantities and thus maintained fresh and in sweet condition.

It will be noted that the water receptacle or trap chamber and the tube member are carried by the jar top and are brought into position for use merely by screwing of the jar top into place on an ordinary Mason fruit jar, or the like. The device thus constructed is inexpensive and takes up but little room for its use and operation, and does not require any particular type of receptacle or container for its use. In the use of the device, very small quantities of the juices of grapes, or other dried fruit and berries, may be made so as to insure the juices being fresh and unfermented.

In order to prevent the choking of the gas outlet tube or passage in the cap, the cap may be provided upon its inner side and over such passage with a screen or other suitable device for holding back solid or other particles tending to choke the passage.

In Figure 2, there is shown a screen 36 which is secured across the lower end of the gas chamber 17 so as to hold back particles of dried fruit or the like, floating in the top of the jar, from entering the chamber.

What I claim is:—

A jar cap provided with an upstanding annular wall and having a transverse partition within the wall dividing the same into a water receptacle and a gas chamber, said water receptacle being closed at its bottom by the top of the cap and said top of the cap being apertured beneath said chamber for establishing communication between the chamber and the interior of the cap, said chamber having a closed top wall, and a tube opening at one end through said top wall and being arched downwardly into said water receptacle, whereby a body of water in said receptacle is adapted to seal the lower end of said tube against ingress of air and is adapted to permit escape of gases under pressure from said chamber.

In testimony whereof I affix my signature.

RUDOLPH H. REH.